US012448249B2

(12) United States Patent
Haikonen et al.

(10) Patent No.: US 12,448,249 B2
(45) Date of Patent: Oct. 21, 2025

(54) METHOD FOR CONSTRUCTING ELEVATOR AND SUCH ELEVATOR

(71) Applicant: Kone Corporation, Helsinki (FI)

(72) Inventors: Aki Haikonen, Helsinki (FI); Anssi Venho, Helsinki (FI); Mika Ijas, Helsinki (FI); Kai Prusti, Helsinki (FI); Jukka Laitinen, Helsinki (FI); Tarvo Viita-Aho, Helsinki (FI)

(73) Assignee: Kone Corporation, Helsinki (FI)

( * ) Notice: Subject to any disclaimer, the term of this patent is extended or adjusted under 35 U.S.C. 154(b) by 62 days.

(21) Appl. No.: 18/500,765

(22) Filed: Nov. 2, 2023

(65) Prior Publication Data

US 2025/0145416 A1 May 8, 2025

Related U.S. Application Data

(63) Continuation of application No. PCT/EP2021/063136, filed on May 18, 2021.

(51) Int. Cl.
*B66B 19/00* (2006.01)
*B66B 7/02* (2006.01)
(Continued)

(52) U.S. Cl.
CPC ............ *B66B 19/002* (2013.01); *B66B 7/023* (2013.01); *B66B 19/02* (2013.01); *B66B 19/04* (2013.01)

(58) Field of Classification Search
CPC ............... B66B 11/002; B66B 11/0005; B66B 11/0045; B66B 19/00
See application file for complete search history.

(56) References Cited

U.S. PATENT DOCUMENTS 11,780,706 B2 * 10/2023 Wang ...................... B66B 19/00 187/250

FOREIGN PATENT DOCUMENTS

AU 625660 B2 * 7/1992
DE 202014000273 U1 * 5/2014 ............. B66B 11/00
(Continued)

OTHER PUBLICATIONS

International Search Report PCT/ISA/210 and Written Opinion PCT/ISA/237 for International Application No. PCT/EP2021/063136 on May 18, 2021.

*Primary Examiner* — Diem M Tran
(74) *Attorney, Agent, or Firm* — Harness, Dickey & Pierce, P.L.C.

(57) ABSTRACT

The invention relates to a method for constructing an elevator, comprising piling plurality of prefabricated modules on top of each other, such that the hoistway spaces of the prefabricated modules are vertically aligned forming a continuous vertically elongated hoistway where the elevator car and the counterweight can be fitted to move; and arranging the elevator car and the counterweight to be vertically movable in the hoistway. The plurality of prefabricated hoistway modules comprise a prefabricated top module comprising a machinery for driving a hoisting roping, and the prefabricated top module comprises one or more car guide rail sections and one or more counterweight guide rail sections, wherein the machinery for driving a hoisting roping is mounted on a support structure, which is mounted on plurality of said guide rail sections of the prefabricated top module. The invention also relates to an elevator obtained with the method.

14 Claims, 6 Drawing Sheets

(51) Int. Cl.
*B66B 19/02* (2006.01)
*B66B 19/04* (2006.01)

(56) References Cited

FOREIGN PATENT DOCUMENTS

| | | | | |
|---|---|---|---|---|
| EP | 0913353 | A1 * | 5/1999 | |
| EP | 2559647 | A1 * | 2/2013 | ............ B66B 19/00 |
| EP | 3747820 | A1 | 12/2020 | |
| SE | 532256 | C2 | 11/2009 | |

* cited by examiner

METHOD FOR CONSTRUCTING ELEVATOR AND SUCH ELEVATOR

CROSS-REFERENCE TO RELATED APPLICATION

This application is a continuation of PCT International Application No. PCT/EP2021/063136 which has an International filing date of May 18, 2021, the entire contents of which are incorporated herein by reference.

FIELD OF THE INVENTION

The invention relates to a method for constructing an elevator, and to an elevator, wherein the elevator preferably is an elevator for vertically transporting passengers and/or goods.

BACKGROUND OF THE INVENTION

Conventionally, elevators have been built either by installing elevator components into an earlier constructed hoistway. A drawback has been that all elevator installation work taking place at the construction site consumes lots of time and complicates logistics of the construction site. A drawback has also been that accurate positioning of components has required lots of adjustment at the site.

Also modular elevator solutions have been introduced, where an elevator is partly built from several modules having a load-bearing metal beam frame. The modular solutions have the advantage that an elevator is very quick to build, such as in a couple of days. A drawback has been that the solutions have required a sturdy and robust hoistway beam frame or corresponding. These solutions have not excelled in cost-efficiency of the modules particularly due to costs and mass of the hoistway beam frame, and thereby high costs compared to conventional solutions. Another drawback has been that a sturdy and robust hoistway beam frame consumes relatively much of the space where the modular elevator is to be installed.

BRIEF DESCRIPTION OF THE INVENTION

The object of the invention is to provide a method for constructing an elevator and an elevator, which utilize modularity thereby facilitating quick installation, yet being efficient in terms of space consumption and material costs.

An object is particularly to alleviate one or more of the above defined drawbacks of prior art and/or problems discussed or implied elsewhere in the description.

Embodiments are disclosed, inter alia, where a modular elevator is provided having a lightweight frame with reduced space consumption.

Embodiments are disclosed, inter alia, where a modular elevator is provided having good stability and bearing abilities of structures, while relatively good freedom to position the machinery of the elevator.

Embodiments are disclosed, inter alia, where a counter-weighted machine-roomless elevator is achieved.

It is brought forward a new method for constructing an elevator, comprising

- providing an elevator car and a counterweight;
- providing plurality of prefabricated hoistway modules to be piled on top of each other, each hoistway module bordering a hoistway space; and
- piling said plurality of prefabricated modules on top of each other, such that the hoistway spaces of the prefabricated modules are vertically aligned forming a continuous vertically elongated hoistway where the elevator car and the counterweight can be fitted to move; and
- arranging the elevator car and the counterweight to be vertically movable in the hoistway,
- wherein the plurality of prefabricated hoistway modules comprise a prefabricated top module comprising a machinery for driving a hoisting roping, and the prefabricated top module comprises one or more car guide rail sections and one or more counterweight guide rail sections.
- wherein the machinery for driving a hoisting roping is mounted on a support structure, which is mounted on plurality of said guide rail sections of the prefabricated top module.

With this solution, one or more of the above mentioned advantages and/or objectives are achieved.

Preferable further features are introduced in the following paragraphs. Subject matter of the following paragraphs can be combined with the method individually or in any combination.

In a preferred embodiment, said support structure is a beam. The longitudinal axis of the beam is preferably orthogonal to the guide rail sections of said plurality of guide rail sections. Accordingly, the beam is horizontal after said piling.

In a preferred embodiment, the plurality of prefabricated hoistway modules comprise a prefabricated pit module, and one or more prefabricated intermediate modules.

In a preferred embodiment, at least an upper end of the elevator car and at least an upper end of the counterweight can be fitted to move into the hoistway space of the top module.

In a preferred embodiment, said plurality of guide rail sections includes one or more car guide rail sections and one or more counterweight guide rail sections.

In a preferred embodiment, said plurality of guide rail sections includes three parallel guide rail sections positioned to extend via (different) tips of a triangle, in particular such that their central axes extend via tips of a triangle.

In a preferred embodiment, the support structure is fixed to the upper ends of said plurality of guide rail sections.

In a preferred embodiment, the support structure is fixed to the upper end of each of the plurality of guide rail sections by a fixing bracket.

In a preferred embodiment, more than one, preferably all, of the guide rail sections of said plurality are below the support structure such that their vertical silhouettes overlap.

The guide rail sections of said plurality are arranged to obstruct downwards directed movement of the support structure. Preferably, no gap exists between the upper face of one or more of the guide rail sections and the support structure or if a gap exists between the upper face of one or more of the guide rail sections and the support structure each gap is filled with a block member for transmitting support force between the upper face and the support structure.

In a preferred embodiment, after said piling, each guide rail section of said plurality of guide rail sections carries via said support structure at least partly (preferably more than half of, most preferably all of) the total weight of the machinery and components suspended by the machinery, said components including roping, elevator car and counterweight.

In a preferred embodiment, after said piling, each guide rail section of said plurality of guide rail sections rests vertically supported by a guide rail section located below it, in particular a guide rail section of an intermediate module located below the top module.

In a preferred embodiment, after said piling, one or more prefabricated intermediate modules are between a pit module and the top module.

In a preferred embodiment, guide rail sections of an intermediate module rest vertically supported by guide rail sections of a hoistway module located below the intermediate module, such as another intermediate module or a pit module.

In a preferred embodiment, in said arranging the elevator car is arranged to be vertically movable in the hoistway along one or more guide rail lines for guiding the elevator car (1), and the counterweight is arranged to be vertically movable in the hoistway along one or more guide rail lines for guiding the counterweight (2).

In a preferred embodiment, each said prefabricated hoistway module comprises one or more car guide rail sections and one or more counterweight guide rail sections.

In a preferred embodiment, the car guide rail sections of the prefabricated hoistway modules have been positioned in the prefabricated modules such that when the hoistway modules are piled on top of each other, the car guide rail sections of the modules become vertically aligned forming one or more continuous vertical guide rail lines for guiding the elevator car.

In a preferred embodiment, the counterweight guide rail sections of the prefabricated hoistway modules have been positioned in the prefabricated modules such that when the hoistway modules have been piled on top of each other, the counterweight guide rail sections of the prefabricated hoistway modules become vertically aligned forming one or more continuous vertical guide rail lines for guiding the counterweight.

In a preferred embodiment, in said piling said plurality of prefabricated modules are piled on a floor such that guide rail sections of the pit module rest vertically supported by the floor.

In a preferred embodiment, in said piling, said plurality of prefabricated modules are piled into a space delimited by a building, such as a space delimited by plurality of internal walls and a floor, e.g. internal concrete walls of the building.

In a preferred embodiment, each module comprises a tubular frame around the hoistway space of the module.

In a preferred embodiment, in said piling, said plurality of prefabricated modules are piled on top of each other such that the tubular frame of each prefabricated module carries the weight of the tubular frames of all the prefabricated modules filed on top of it.

In a preferred embodiment, each said tubular frame is a beam frame, in particular comprising plurality of beams rigidly connected together. Preferably, the beam frame comprises horizontal beams, vertical beams and preferably also diagonal beams which are rigidly connected together. Preferably, said beams of the beam frame include four vertical corner beams, which are connected by horizontal beams, and plurality of diagonal beams extending at an inclined angle in a space bordered by two vertical beams and two horizontal beams. The opposite ends of each diagonal beams is attached, preferably by welding, to two other beams, most preferably to a vertical beam and a horizontal beam.

In a preferred embodiment, the beams of the beam frame include at least four vertical corner beams, which are connected by horizontal beams such that a rectangular cuboid structure is formed.

In a preferred embodiment, the beams of the beam frame are tubular metal beams. Hereby, the beam frame is rigid and light whereby large modules can be formed and lifted into place. This structure also reduces forces to be borne when piled, whereby a high pile of modules is possible.

In a preferred embodiment, each said guide rail section of the top module is laterally supported on the tubular frame of the top module with one or more fixing brackets.

In a preferred embodiment, the machinery for driving a hoisting roping comprises a motor and a drive wheel. The motor is preferably an electric motor.

In a preferred embodiment, the motor and a drive wheel are coaxial, preferably the drive sheave fixedly connected with the rotor of the motor.

In a preferred embodiment, wherein each said guide rail section is made of metal.

In a preferred embodiment, during said piling the elevator car is at least partially inside the hoistway space of one of the prefabricated modules, preferably the pit module.

In a preferred embodiment, during said piling a counterweight is at least partially inside the hoistway space of one of the prefabricated modules, preferably the pit module.

In a preferred embodiment, the elevator is moreover provided with an elevator control system, which is configured such that the elevator control controls vertical movement of the elevator car between two or more vertically displaced landings automatically in response to signals from user one or more interfaces, preferably user interfaces located at landings or a user interface inside the elevator car or user interfaces formed by applications installed on a mobile device such as mobile phone or table for instance, or from any combination of these different interfaces. Preferably, the car has an interior space suitable for receiving a passenger or passengers, and the car can be provided with a door for forming a closed interior space, such as an automatic door.

In a preferred embodiment, said arranging the elevator car and counterweight to be vertically movable in the hoistway comprises suspending the elevator car and counterweight with a hoisting roping passing around a drive wheel of the machinery. Preferably, in said suspending said roping is arranged to pass from a first rope terminal downwards to the elevator car, around one or more rope wheels of the car, upwards to the machinery, around the drive wheel thereof, downwards to the counterweight, around one or more rope wheels of the counterweight, upwards to a second rope terminal.

In a preferred embodiment, the roping preferably comprising plurality of ropes, which are belt-shaped.

It is also brought forward a new elevator, comprising an elevator car and a counterweight;

plurality of prefabricated hoistway modules piled on top of each other, each hoistway module bordering a hoistway space, the hoistway spaces of the prefabricated modules being vertically aligned forming a continuous vertically elongated hoistway;

wherein the elevator car and the counterweight are vertically movable in the hoistway; and wherein the plurality of prefabricated hoistway modules comprises a prefabricated top module comprising a machinery for driving a hoisting roping, and the prefabricated top module comprises one or more car guide rail sections and one or more counterweight guide rail sections; and wherein the machinery for driving a hoisting roping is mounted on a support structure, which is mounted on plurality of said guide rail sections of the prefabricated top module.

With this solution, one or more of the above mentioned advantages and/or objectives are achieved.

Preferable further features are introduced in the following paragraphs. Subject matter the following paragraphs can be combined with the elevator individually or in any combination.

In a preferred embodiment, the plurality of prefabricated hoistway modules comprise a prefabricated pit module, and one or more prefabricated intermediate modules. In particular, the plurality of prefabricated hoistway modules have been piled on top of each other such that the one or more prefabricated intermediate modules are between the pit module and the top module.

In a preferred embodiment of the elevator or method described anywhere above, the machinery for driving a hoisting roping comprises a motor and a drive wheel, wherein the motor is preferably an electric motor.

In a preferred embodiment of the elevator or method described anywhere above, said support structure is a horizontal beam. The longitudinal axis of the beam is preferably orthogonal to the guide rail sections of said plurality of guide rail sections.

In a preferred embodiment of the elevator or method described anywhere above, said plurality of guide rail sections includes one or more car guide rail sections and one or more counterweight guide rail sections.

In a preferred embodiment of the elevator or method described anywhere above, said plurality of guide rail sections includes three parallel guide rail sections positioned to extend via (different) tips of a triangle, in particular such that their central axes extend via tips of a triangle.

In a preferred embodiment of the elevator or method described anywhere above, each of said plurality of guide rail sections has T-shaped cross section.

In a preferred embodiment of the elevator or method described anywhere above, said plurality of guide rail sections includes three parallel guide rail sections, one car guide rail sections and two counterweight guide rail sections.

In a preferred embodiment of the elevator or method described anywhere above, the support structure is fixed to the upper ends of said plurality of guide rail sections.

In a preferred embodiment of the elevator or method described anywhere above, the support structure is fixed to the upper end of each of the plurality of guide rail sections by a fixing bracket.

In a preferred embodiment of the elevator or method described anywhere above, more than one, preferably all, of the guide rail sections of said plurality are below the support structure such that their vertical silhouettes overlap.

In a preferred embodiment of the elevator or method described anywhere above, the guide rail sections of said plurality are arranged to obstruct downwards directed movement of the support structure. Preferably, no gap exists between the upper face of one or more of the guide rail sections and the support structure or if a gap exists between the upper face of one or more of the guide rail sections and the support structure each gap is preferably filled with a block member for transmitting support force between the upper face and the support structure.

In a preferred embodiment of the elevator or method described anywhere above, the support structure is a tubular metal beam. It is preferably more than 1 meter long. This facilitates stability thereof.

In a preferred embodiment of the elevator, each guide rail section of said plurality of guide rail sections carries via said support structure at least partly (preferably more than half of, most preferably all of) the total weight of the machinery and components suspended by the machinery, said components including roping, elevator car and counterweight.

In a preferred embodiment of the elevator, each guide rail section of said plurality of guide rail sections rests vertically supported by a guide rail section located below it, in particular a guide rail section of an intermediate module located below the top module.

In a preferred embodiment of the elevator, guide rail sections of an intermediate module rest vertically supported by guide rail sections of a hoistway module located below the intermediate module, such as another intermediate module or a pit module.

In a preferred embodiment of the elevator, the elevator car is to vertically movable in the hoistway along one or more guide rail lines for guiding the elevator car, and the counterweight is vertically movable in the hoistway along one or more guide rail lines for guiding the counterweight.

In a preferred embodiment of the elevator, each said prefabricated hoistway module comprises one or more car guide rail sections and one or more counterweight guide rail sections.

In a preferred embodiment of the elevator, each said prefabricated module comprises a tubular frame around the hoistway space of the module.

In a preferred embodiment of the elevator, each said guide rail section of the top module is laterally supported on the tubular frame of the top module with one or more fixing brackets.

In a preferred embodiment of the elevator, the car guide rail sections of the prefabricated hoistway modules are vertically aligned forming one or more continuous vertical guide rail lines for guiding the elevator car.

In a preferred embodiment of the elevator, the counterweight guide rail sections of the prefabricated hoistway modules are vertically aligned forming one or more continuous vertical guide rail lines for guiding the counterweight.

In a preferred embodiment of the elevator, guide rail sections of the pit module rest vertically supported by a floor.

In a preferred embodiment of the elevator, said plurality of prefabricated modules are in a space delimited by a building, such as a space delimited by plurality of internal walls and a floor, e.g. internal concrete walls of the building.

In a preferred embodiment of the elevator, the tubular frame of each prefabricated module carries the weight of the tubular frames of all the prefabricated modules piled on top of it.

In a preferred embodiment of the elevator, each said tubular frame is a beam frame. The tubular frame is preferably as described anywhere above.

In a preferred embodiment of the elevator, the elevator car and counterweight are suspended with a hoisting roping passing around a drive wheel of the machinery. Preferably, said roping passes from a first rope terminal downwards to the elevator car, around one or more rope wheels of the car, upwards to the machinery, around the drive wheel thereof, downwards to the counterweight, around one or more rope wheels of the counterweight, upwards to a second rope terminal.

In a preferred embodiment of the elevator, the roping of the elevator comprises plurality of ropes, which are preferably belt-shaped.

In a preferred embodiment of the elevator, the elevator has been obtained with the method described anywhere above or defined in any of the preceding claims.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

DETAILED DESCRIPTION

Figure 1:
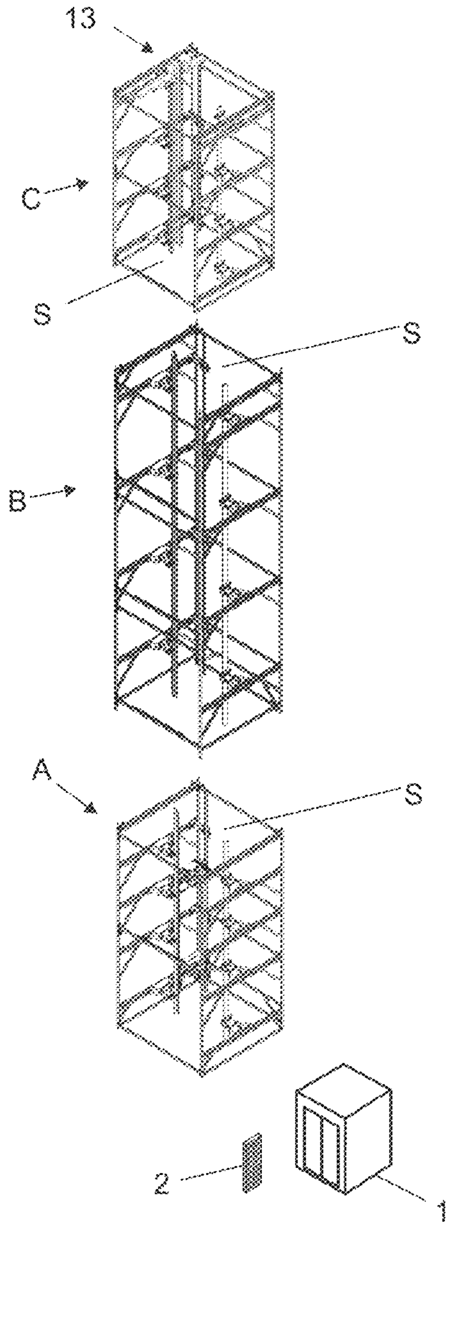
FIG. 1 illustrates a phase in an embodiment of a method for constructing an elevator.
Figure 2:
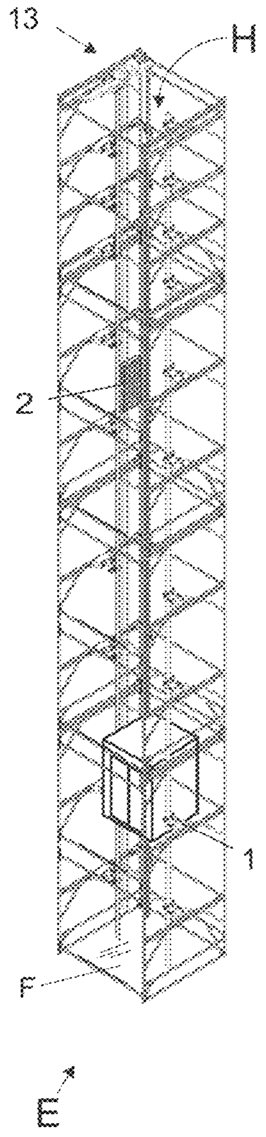
FIG. 2 illustrates an elevator constructed by the method.

FIGS. 1 and 2 illustrate phases of a method for constructing an elevator according to an embodiment of the invention. The method for constructing an elevator E comprises, as illustrated in FIG. 1, providing an elevator car 1 and a counterweight 2, and providing plurality of prefabricated hoistway modules A,B,C to be piled on top of each other, each hoistway module A,B,C bordering a hoistway space S.

The plurality of prefabricated hoistway modules A,B,C comprise a prefabricated top module C comprising a machinery 13 for driving a hoisting roping 21. The prefabricated top module C comprises one or more car guide rail sections 8C and one or more counterweight guide rail sections 9C. The machinery 13 for driving a hoisting roping 21 is mounted on a support structure 10 mounted on plurality (i.e. on more than one) of said guide rail sections 8C,9C of the prefabricated top module C.

Providing support for the support structure 10 by plurality of guide rail sections provides a substantially stable support and reduces weight to be carried per guide rail section. Implementing this by mounting the machinery 13 on a support structure 10 mounted on the plurality of said guide rail sections 8C,9C provides that the advantages related to stability and bearing abilities of the guide rail sections are achieved with relatively good freedom to position the machinery.

The method for constructing an elevator E moreover comprises, as illustrated in FIG. 2, piling said plurality of prefabricated modules A,B,C on top of each other such that the hoistway spaces S of said prefabricated modules A,B,C are vertically aligned and form a continuous vertically elongated hoistway H where the elevator car 1 and the counterweight 2 can be fitted to move. The method for constructing an elevator E moreover comprises arranging the elevator car 1 and the counterweight 2 to be vertically movable in the hoistway H.

It is possible that the elevator car 1 and counterweight 2 can be separate from the modules A-C until said arranging, but preferably each of them is inside the hoistway space S of one of the prefabricated hoistway modules at the time of said piling. Thus, they can be brought to the site and moved at the site thus positioned, and moreover they will thus assume their intended future position in said piling without necessity to insert them at a later time into the hoistway H.

In the embodiment of FIGS. 1 and 2, the plurality of prefabricated hoistway modules A,B,C comprise in addition to said top module C a prefabricated pit module A, and one or more prefabricated intermediate modules B. The whole elevator car 1 and counterweight 2 or at least an upper or lower end thereof can be fitted to move into the hoistway space S of each said hoistway module A;B;C.

Each said prefabricated intermediate modules B is more particularly such that the whole elevator car 1 and counterweight 2 can be fitted to move into and through it. The prefabricated pit module A is more particularly such that at least the lower end of the elevator car 1 and counterweight 2 can be fitted to move into the hoistway space S of the pit module A. The prefabricated top module C is more particularly such that at least an upper end of the elevator car 1 and at least an upper end of the counterweight 2 can be fitted to move into the hoistway space S of the top module C.

Each said module A,B,C comprises a tubular frame F around the hoistway space S of the module A,B,C. Each said tubular frame F is a beam frame F. The beam frame F preferably comprises horizontal beams **14*a*, vertical beams 14*b* and preferably also diagonal beams 14*c*, which beams 14-14*c* are rigidly connected together, as illustrated in FIGS. 1 and 2. Said beams 14-14*c* preferably include four vertical corner beams 14*b*, which are connected by horizontal beams 14*a*, and plurality of diagonal beams 14*c* extending at an inclined angle in a space bordered by two vertical beams 14*b* and two horizontal beams 14*a*. The opposite ends of each diagonal beams is attached, preferably by welding, to a vertical beam 14*b* and a horizontal beam 14*a*. Said four vertical corner beams are connected by horizontal beams such that they form a rectangular cuboid structure is formed. Generally, the beams 14*a*,14*b*,14*c* are preferably tubular metal beams. Thus, the beam frame F is rigid and light whereby large modules can be formed, transported and lifted into place. Light weight reduces forces to be beared in piling, whereby a high pile of modules is possible. Generally, the beams 14*a*,14*b*,14*c*** preferably have one or more planar side faces, such as four planar side faces as illustrated, whereby fixing elevator components to them is facilitated.

In the preferred embodiment of FIGS. 1 and 2, said plurality of guide rail sections 8C,9C includes one or more car guide rail sections 8C and one or more counterweight guide rail sections 9C.

After said piling, each guide rail section 8C,9C of said plurality of guide rail sections 8C,C9 carries via said support structure 10 at least partly (preferably more than half of, most preferably all of) the total weight of the machinery 13 and components suspended by the machinery 13, said components including hoisting roping 21, elevator car 1 and counterweight 2. The total weight to be carried by the plurality of guide rail sections 8C,9C is hereby great. This weight being split to plurality of guide rail sections provides stability and reduced weight to be carried per guide rail section. This facilitates reliability, safety and cost-efficiency of the elevator being constructed.

Figure 3:
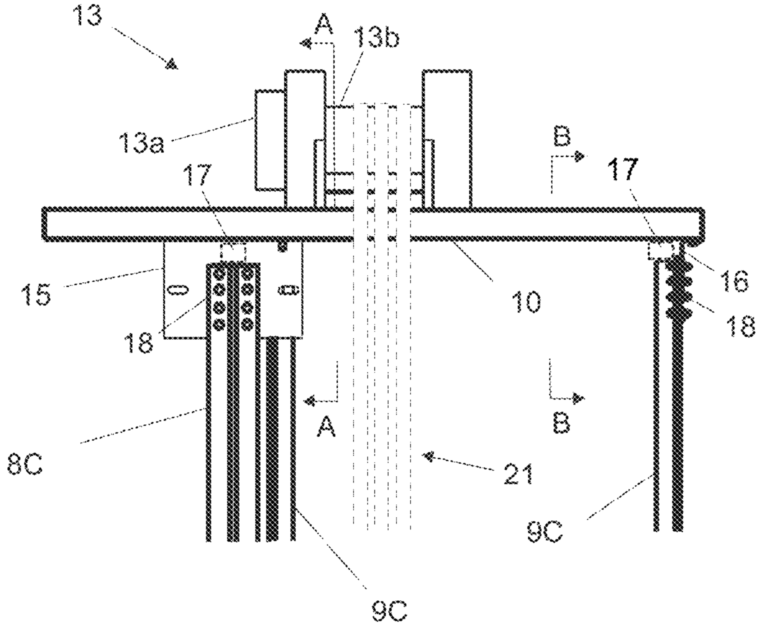
FIG. 3 illustrates preferred details of the top module as seen from direction of the hoistway space of the top module.
Figure 4:
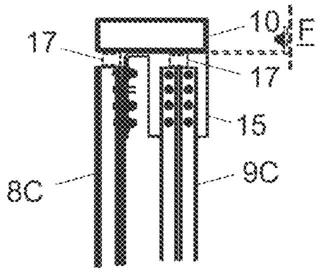
FIG. 4 illustrates cross-section A-A of FIG. 3.
Figure 5:
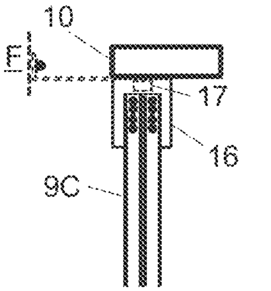
FIG. 5 illustrates cross-section B-B of FIG. 3.

FIGS. 3-5 illustrates preferred details of the top module C. The machinery 13 for driving a hoisting roping 21 comprises a motor **13*a* and a drive wheel 13*b*, wherein the motor 13*a* is preferably an electric motor. Said support structure 10** is a horizontal beam.

Said plurality of guide rail sections 8C,9C includes three parallel guide rail sections 8C,9C, which in the preferred embodiment in particular include one car guide rail section 8C and two counterweight guide rail sections 9C.

Figure 6:
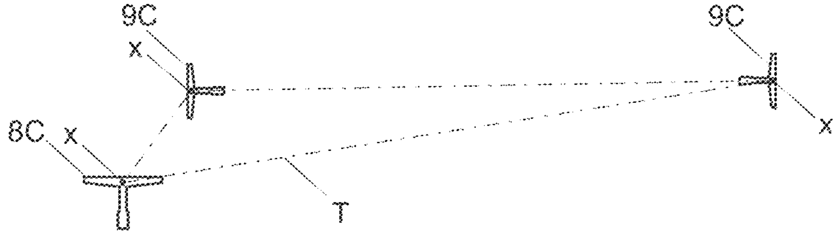
FIG. 6 illustrates from above positions of guide rail sections of FIG. 3.

As illustrated in FIG. 6, said plurality of guide rail sections 8C,9C includes three parallel guide rail sections 8C,9C positioned to extend via (different) tips of a triangle T, in particular such that their central axes x extend via said tips of the triangle T.

As illustrated in FIGS. 3-5, the support structure 10 is fixed to the upper ends of said plurality of guide rail sections 8C,9C. In the embodiment illustrated, the support structure 10 is fixed to the upper end of each of the plurality of guide rail sections 8C,9C by a fixing bracket 15;16. This is more particularly implemented such that the upper end of each of the plurality of guide rail sections 8C,9C is immovably fixed to a fixing bracket 15,16 immovably fixed to the support structure 10. The upper end of each of the plurality of guide rail sections 8C,9C is immovably fixed to a fixing bracket 15;16 by bolts 18 extending through the guide rail section in question and the fixing bracket 15;16 immovably fixed to the support structure 10.

In the preferred embodiment illustrated in FIGS. 3-5, the guide rail sections 8C,9C of said plurality are below the support structure 10 such that their vertical silhouettes overlap, i.e. the vertical silhouette of each guide rail sections 8C,9C overlaps with vertical silhouette of the support structure 10. This facilitates a reliable and simple ability to carry via the support structure a big weight. Hereby, for example harmfully big torques in mechanical connections between parts can be avoided.

The guide rail sections 8C,9C of said plurality are arranged to obstruct downwards directed movement of the support structure 10. Preferably, no gap exists between the upper face of one or more of the guide rail sections 8C,9C and the support structure 10 or if a gap exists between the upper face of one or more of the guide rail sections 8C,9C and the support structure 10 each gap is filled with a block member 17 for transmitting support force between the upper face and the support structure 10.

In said arranging, the elevator car 1 is arranged to be vertically movable in the hoistway H along one or more guide rail lines for guiding the elevator car 1, and the counterweight 2 is arranged to be vertically movable in the hoistway H along one or more guide rail lines for guiding the counterweight 2.

In the preferred method according to the embodiment of FIGS. 1 and 2, each said prefabricated hoistway module A,B,C comprises one or more car guide rail sections 8*a*,8*b*,8*c* and one or more counterweight guide rail sections 9*a*,9*b*,9*c*.

The car guide rail sections 8*a*,8*b*,8*c* of the prefabricated hoistway modules A,B,C have been positioned in the prefabricated modules A,B,C such that when the hoistway modules A,B,C are piled on top of each other, the car guide rail sections 8*a*,8*b*,8*c* of the modules A,B,C become vertically aligned forming one or more continuous vertical guide rail lines 8 for guiding the elevator car 1.

The counterweight guide rail sections 9*a*,9*b*,9*c* of the prefabricated hoistway modules A,B,C have been positioned in the prefabricated modules such that when the hoistway modules A,B,C are piled on top of each other, the counterweight guide rail sections 9*a*,9*b*,9*c* of the prefabricated hoistway modules A,B,C become vertically aligned forming one or more continuous vertical guide rail lines 9 for guiding the counterweight 2.

In the preferred method according to the embodiment of FIGS. 1 and 2, after said piling, each guide rail section 8C,9C of said plurality of guide rail sections 8C,9C rests vertically supported by a guide rail section 8B,9B located below it, in particular a guide rail section 8B,9B of an intermediate module B located below the top module C. The guide rail sections 8B,9B of an intermediate module B rest vertically supported by guide rail sections of a hoistway module A located below the intermediate module B, such as another intermediate module B or a pit module. In FIG. 2, the guide rail sections 8B,9B of the intermediate module B rest vertically supported by guide rail sections 8A,9A of a pit module A located below the intermediate module B.

The lowermost guide rail sections 8A,9A of the guide rail lines 8 and 9, i.e. in FIG. 2 the guide rail sections 8A,9A of the pit module A, rest vertically supported by a floor F. Thus, in the preferred embodiment, the guide rail lines 8,9 support vertically the support structure 10 and the guide rail lines 8,9 are vertically supported by a floor F.

Figure 8:
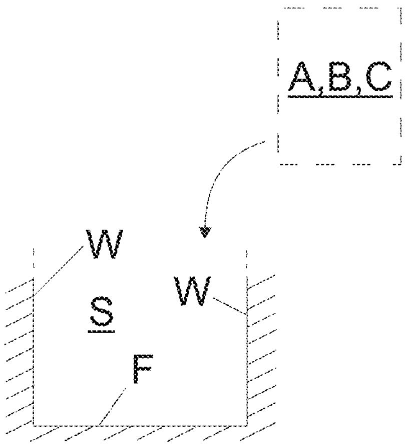
FIG. 8 illustrates preferred details of the method and elevator of FIG. 2.

In the method, preferably, in said piling, said plurality of prefabricated modules A,B,C are piled on top of each other such that the tubular frame F of each prefabricated module A,B carries the weight of the tubular frames F of all the prefabricated modules B,C piled on top of it In the method, preferably, in said piling, said plurality of prefabricated modules A,B,C are piled on top of each other into a space S delimited by a building, such as a space S delimited by plurality of internal walls and a floor F, e.g. internal concrete walls W of the building. This is illustrated in FIG. 8.

Generally, the modules can comprise also additional components, which are not shown, such as hoistway doors.

Figure 9:
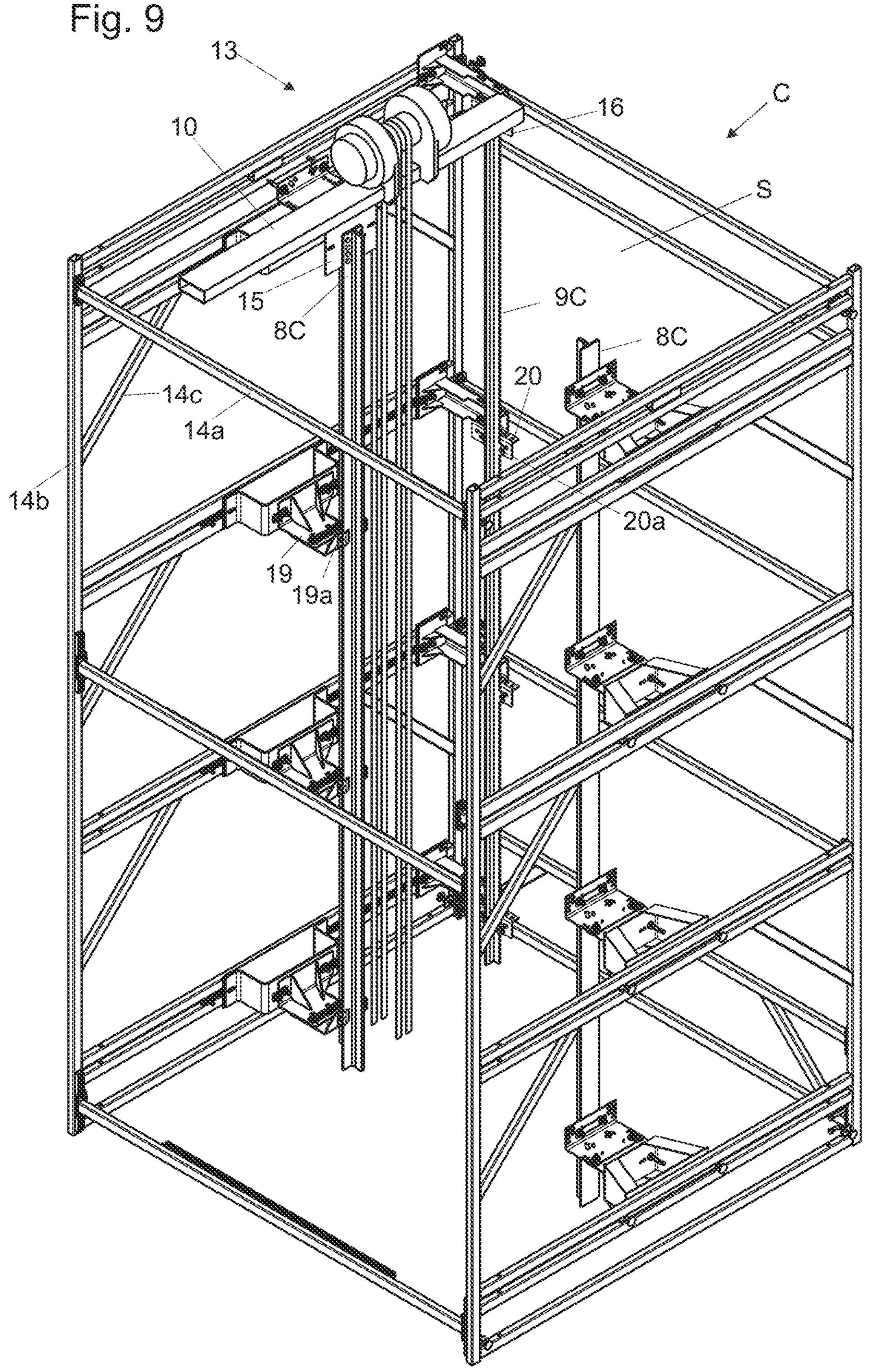
FIG. 9 illustrates preferred details of the top module.
Figure 10:
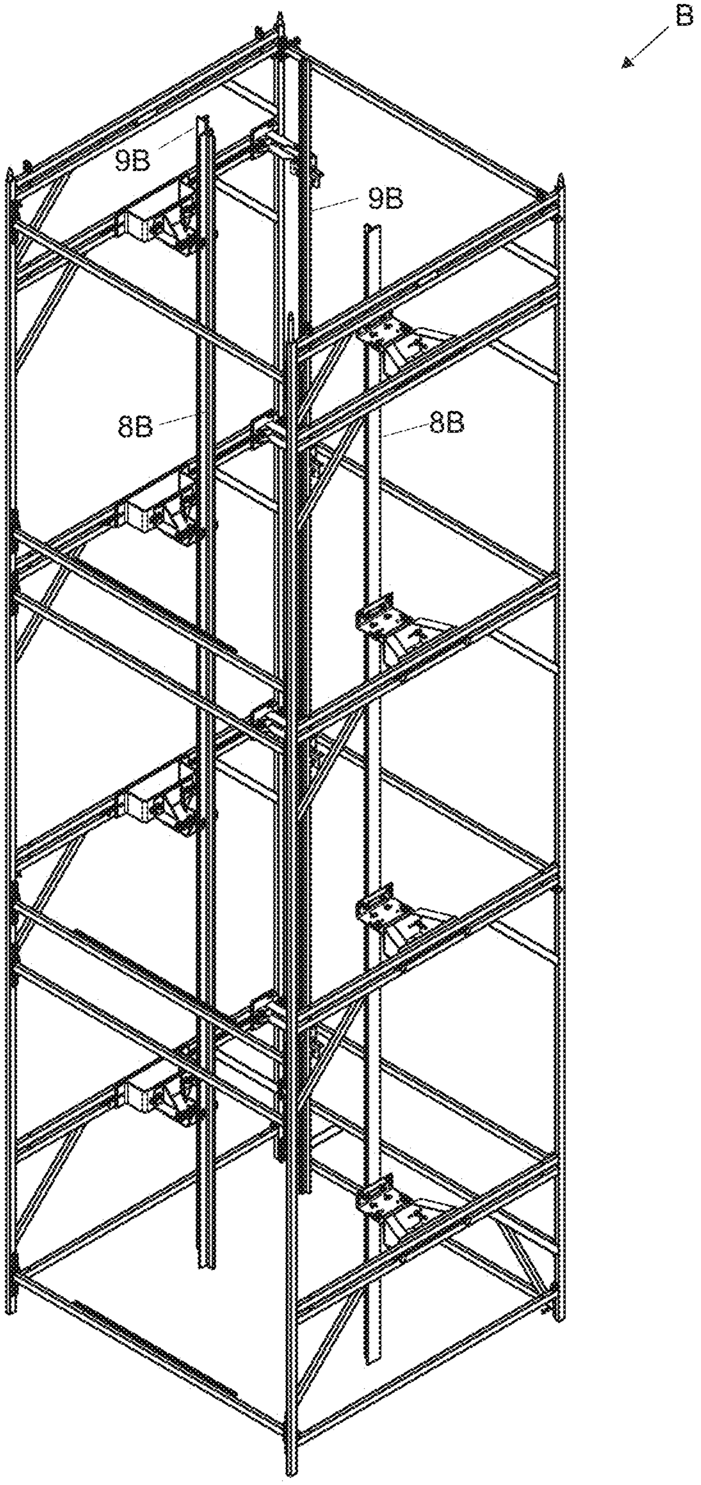
FIG. 10 illustrates preferred details of the intermediate module.
Figure 11:
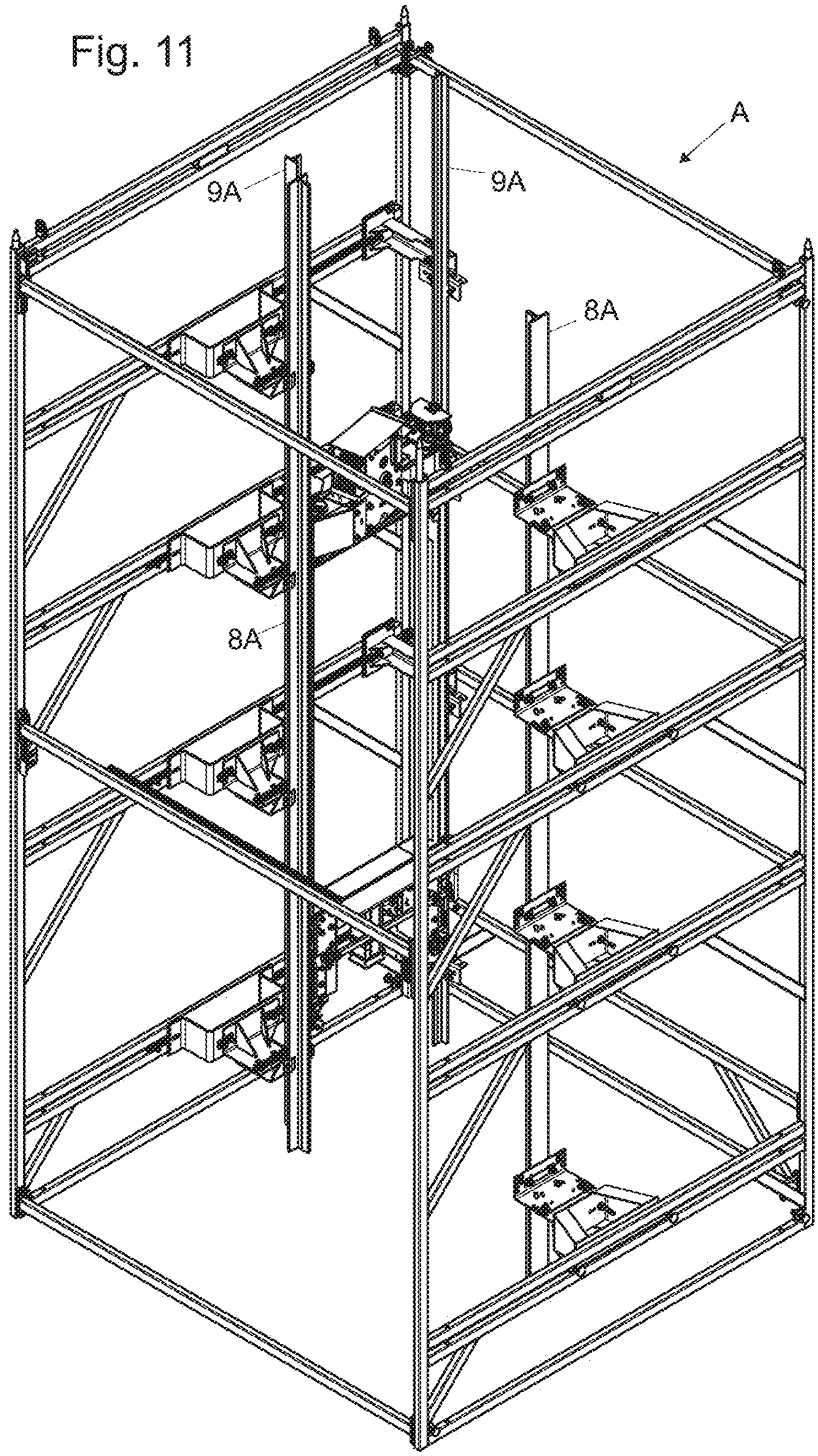
FIG. 11 illustrates preferred details of the pit module.

Preferably, each said guide rail section 8C,9C of the top module is laterally supported on the tubular frame F of the top module with one or more fixing brackets 15, 16, 19. The one or more fixing brackets 15, 16, 19, 20 can comprise the (same) fixing brackets 15,16 by which the support structure 10 is fixed to the upper ends of the plurality of guide rail sections 8C,9C and/or other fixing brackets 19,20. In FIGS. 4 and 5, it is illustrated by broken line a portion of each fixing bracket 15,16 by which the bracket in question can be laterally supported on the tubular frame F. This portion is optional so it is illustrated in broken line. If present, each said optional portion is preferably designed long and able to bend so that the portion does not carry considerable portion of the total weight of the support structure 10 and the components carried by it. This facilitates focusing the bearing ability on the guide rail lines rather than the frame F. In FIG. 9, the optional portions of said brackets 15,16 are illustrated by solid lines whereas in FIGS. 4 and 5 the optional portions of said brackets 15,16 connecting these to the frame F are shown only schematically and in broken line. Said other fixing brackets 19,20 preferably laterally support the guide rail sections 8C,9C via a guide rail clips gripping the guide rail sections 8C,9C frictionally in a gripping gap so that the guide rail sections 8C,9C can be moved in the gripping gap vertically but not laterally. To serve this purpose a conventional guide rail clip or equivalent can be used. Ability of the guide rail sections 8C,9C to move vertically facilitates focusing the bearing ability on the guide rail lines rather than the frame F.

Figure 7:
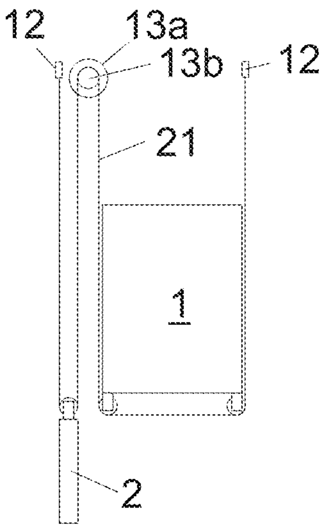
FIG. 7 illustrates preferred details of the elevator of FIG. 2.

Said arranging the elevator car 1 and counterweight to be vertically movable in the hoistway H comprises suspending the elevator car 1 and counterweight 2 with a hoisting roping 21 passing around a drive wheel 13*b* of the machinery 13. FIG. 7 illustrates preferred details of how the roping 21 passes. In said suspending said roping 21 is arranged to pass (in this order) from a first rope terminal 12*a* downwards to the elevator car 1, around one or more rope wheels of the car 1, upwards to the machinery 13, around the drive wheel 13*b* thereof, downwards to the counterweight 2, around one or more rope wheels of the counterweight 2, upwards to a second rope terminal 12*b*. The roping 21 preferably comprises plurality of ropes, which are preferably belt-shaped.

Generally, it is preferable that each said guide rail section 8A-8C, 9A-9C is preferably made of metal. Thus, they can carry big vertical loads. Generally, it is preferable that each said guide rail section 8A-8C, 9A-9C has a T-shaped cross section, as illustrated. Thereby, normal elevator components in this sense can be used. The material and/or shape of the guide rail sections of course could alternatively be different. The T-shaped cross section is preferably in particular such that, each of said plurality of guide rail sections 8A-8C, 9A-9C comprises a base plate, and from the central portion of the base plate, in particular from between the side edges, a guide plate branches off towards one side of the guide rail section, the guide plate comprising flanks against which guide elements mounted on the car 1 or counterweight 2 to be guided by the guide rail section 8A-8C, 9A-9C in question are arranged to run in said arranging.

In the method, the elevator is preferably moreover provided with an elevator control system, which is configured such that the elevator control controls vertical movement of the elevator car between two or more vertically displaced landings automatically in response to signals from user one or more interfaces, preferably user interfaces located at landings or a user interface inside the elevator car or user interfaces formed by applications installed on a mobile device such as mobile phone or table for instance, or from any combination of these different interfaces.

An embodiment of the elevator E according to the invention has been illustrated in FIG. 2. The elevator has preferably been obtained with the method described referring to FIGS. 1-11. Thus, preferred features of the elevator have also been described earlier above in context of the method.

The elevator E comprises an elevator car 1 and a counterweight 2; and plurality of prefabricated hoistway modules A,B,C piled on top of each other, each hoistway module A,B,C bordering a hoistway space S such that the hoistway spaces S of the prefabricated modules A,B,C are vertically aligned forming a continuous vertically elongated hoistway H. The elevator car 1 and the counterweight are vertically movable in the hoistway H. The plurality of prefabricated hoistway modules A,B,C comprise a prefabricated top module C comprising a machinery 13 for driving a hoisting roping 21, and the prefabricated top module C comprises one or more car guide rail sections 8C and one or more counterweight guide rail sections 9C. The machinery 13 for driving a hoisting roping 21 is mounted on a support structure 10, which is mounted on plurality of said guide rail sections 8C,9C of the prefabricated top module C. In the preferred embodiment, said support structure 10 is a horizontal beam.

In the preferred embodiment, said plurality of guide rail sections 8C,9C includes one or more car guide rail sections 8C and one or more counterweight guide rail sections 9C. As illustrated in FIG. 6, said plurality of guide rail sections 8C,9C includes three parallel guide rail sections 8C,9C positioned to extend via tips of a triangle T, in particular such that their central axes x extend via tips of a triangle T. The support structure 10 is fixed to the upper ends of said plurality of guide rail sections 8C,9C.

In the preferred embodiment, the guide rail sections 8C,9C of said plurality are below the support structure 10 such that their vertical silhouettes overlap.

Each guide rail section 8C,9C of said plurality of guide rail sections 8C,9C carries via said support structure 10 at least partly (preferably more than half of, most preferably all of) the total weight of the machinery 13 and components suspended by the machinery 13, said components including roping 21, elevator car 1 and counterweight 2.

Each guide rail section 8C,9C of said plurality of guide rail sections 8C,9C rests vertically supported by a guide rail section 8B,9B located below it, in particular a guide rail section 8B,9B of an intermediate module B located below the top module C.

Guide rail sections 8B,9B of an intermediate module B rest vertically supported by guide rail sections 8A,9A of a hoistway module A located below the intermediate module B, such as another intermediate module B or a pit module A.

Each module A,B,C comprises a tubular frame F around the hoistway space S of the module A,B,C.

The tubular frame F of each prefabricated module A,B preferably carries the weight of the tubular frames F of all the prefabricated modules B,C piled on top of it.

In the elevator, the elevator car 1 and counterweight 2 are preferably suspended with a hoisting roping 21 passing around a drive wheel 13*b*, and said roping 21 passes from a first rope terminal 12*a* downwards to the elevator car 1, around one or more rope wheels of the car 1, upwards to the machinery 13, around the drive wheel 13*b* thereof, downwards to the counterweight 2, around one or more rope wheels of the counterweight 2, and upwards to a second rope terminal 12*b*, as illustrated in FIG. 7.

Guide rail sections 8A,9A of the pit module A preferably rest vertically supported by a floor F, as illustrated in FIG. 2.

In the elevator E, said plurality of prefabricated modules are preferably in a space S delimited by a building, such as a space S delimited by plurality of internal walls W and a floor F, e.g. internal concrete walls of the building, as illustrated in FIG. 8.

Generally, the features of each module A,B,C and the elevator E have been described as they are when the module A,B,C or the elevator E in question is in upright state, i.e. when the guide rail sections of the module or elevator in question are vertically oriented.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. A method for constructing an elevator, comprising providing an elevator car and a counterweight;

providing plurality of prefabricated hoistway modules to be piled on top of each other, each prefabricated hoistway module bordering a hoistway space; and piling said plurality of prefabricated hoistway modules on top of each other, such that the hoistway spaces of the prefabricated hoistway modules are vertically aligned forming a continuous vertically elongated hoistway where the elevator car and the counterweight can be fitted to move; and arranging the elevator car and the counterweight to be vertically movable in the hoistway, wherein the plurality of prefabricated hoistway modules comprise a prefabricated top module comprising a machinery for driving a hoisting roping, and the prefabricated top module comprises a plurality of guide rail sections, the plurality of guide rail sections include one or more car guide rail sections and one or more counterweight guide rail sections, wherein the machinery for driving the hoisting roping is mounted on top of a support structure, which is mounted on uppermost portions of at least one of the car guide rail sections and at least one of the counterweight guide rail sections of the prefabricated top module by plurality of brackets, respectively, the plurality of brackets configured to secure the support structure directly above the uppermost portions of at least one of the car guide rail sections and at least one of the counterweight guide rail sections of the prefabricated top module such that the support structure vertically overlaps the at least one of the car guide rail sections and the at least one of the counterweight guide rail sections of the prefabricated top module.

2. A method according to claim 1, wherein the plurality of prefabricated hoistway modules comprises a prefabricated pit module, and one or more prefabricated intermediate modules.

3. A method according to claim 1, wherein each said prefabricated hoistway module comprises one or more car guide rail sections and one or more counterweight guide rail sections.

4. A method according to claim 1, wherein said arranging the elevator car and counterweight to be vertically movable in the hoistway comprises suspending the elevator car and counterweight with the hoisting roping passing around a drive wheel, and in said suspending said roping is arranged to pass from a first rope terminal downwards to the elevator car, around one or more rope wheels of the elevator car, upwards to the machinery, around the drive wheel thereof, downwards to the counterweight, around one or more rope wheels of the counterweight, upwards to a second rope terminal, the roping comprising plurality of ropes, the plurality of ropes being belt-shaped.

5. The method according to claim 1, wherein a drive wheel of the machinery is horizontally offset from the plurality of guide rail sections.

6. An elevator, comprising an elevator car and a counterweight;

plurality of prefabricated hoistway modules piled on top of each other, each hoistway module bordering a hoistway space, the hoistway spaces of the prefabricated hoistway modules being vertically aligned forming a continuous vertically elongated hoistway;

wherein the elevator car and the counterweight are vertically movable in the hoistway; and wherein the plurality of prefabricated hoistway modules comprises a prefabricated top module comprising a machinery for driving a hoisting roping, and the prefabricated top module comprises a plurality of guide rail sections, the plurality of guide rail sections including one or more car guide rail sections and one or more counterweight guide rail sections, wherein the machinery for driving the hoisting roping is mounted on a support structure, which is mounted on uppermost portions of at least one of the car guide rail sections and at least one of the counterweight guide rail sections of the prefabricated top module by a plurality of brackets, respectively, the plurality of brackets configured to secure the support structure directly above the uppermost portions of at least one of the car guide rail sections and at least one of the counterweight guide rail sections of the prefabricated top module such that the support structure vertically overlaps the at least one of the car guide rail sections and the at least one of the counterweight guide rail sections of the prefabricated top module.

7. An elevator according to claim 6, wherein said support structure is a horizontal beam fixed to the uppermost portion of each of the at least one of the car guide rail sections and the at least one of the counterweight guide rail sections.

8. An elevator according to claim 6, wherein the said plurality of guide rail sections includes three parallel guide rail sections positioned to extend via tips of a triangle such that central axes of the three parallel guide rail sections extend via the tips of the triangle.

9. An elevator according to claim 6, wherein each guide rail section of the plurality of guide rail sections carries via said support structure at least partly a total weight of the machinery and components suspended by the machinery, said components including the hoisting roping, the elevator car and the counterweight.

10. An elevator according to claim 6, wherein each guide rail section of the plurality of guide rail sections rests vertically supported by a guide rail section located below the respective guide rail section and the top module.

11. An elevator according to claim 6, wherein each module comprises a tubular frame around the hoistway space of the module.

12. An elevator according to claim 11, wherein the tubular frame of each prefabricated hoistway module carries a weight of the tubular frames of all the prefabricated hoistway modules piled on top of it.

13. An elevator according to claim 6, wherein the elevator car and counterweight are suspended with the hoisting roping passing around a drive wheel of the machinery, and said hoisting roping passes from a first rope terminal downwards to the elevator car, around one or more rope wheels of the elevator car, upwards to the machinery, around the drive wheel thereof, downwards to the counterweight, around one or more rope wheels of the counterweight, and upwards to a second rope terminal.

14. An elevator according to claim 6, wherein a drive wheel of the machinery is horizontally offset from the plurality of guide rail sections.

* * * * *